United States Patent
Harvey et al.

[11] Patent Number: 5,740,754
[45] Date of Patent: Apr. 21, 1998

[54] AIR LIFTED MOTION ISOLATION SYSTEM AND METHOD THEREFOR

[75] Inventors: William B. Harvey, Olney; Leonard S. Haynes, Rockville, both of Md.

[73] Assignee: Intelligent Automation, Inc., Rockville, Md.

[21] Appl. No.: 827,595

[22] Filed: Mar. 28, 1997

[51] Int. Cl.⁶ .................................................. B63B 1/16
[52] U.S. Cl. ................................. 114/273; 114/253
[58] Field of Search .......................... 114/242, 253, 114/254, 121, 122, 270, 272, 273

[56] References Cited

U.S. PATENT DOCUMENTS

| | | | |
|---|---|---|---|
| 1,718,036 | 6/1929 | Douglass | 114/272 |
| 4,738,414 | 4/1988 | McCulloh | 114/253 |

*Primary Examiner*—Ed L. Swinehart
*Attorney, Agent, or Firm*—Morton J. Rosenberg; David I. Klein; Jun Y. Lee

[57] ABSTRACT

An air lifted motion isolation system (100) includes a support structure or pod (110) for supporting equipment and/or personnel to be isolated from the motion of a waterborne craft (102). The support structure is coupled to the waterborne craft structure by a pivotal coupling assembly (120), permitting the support structure to be displaced both vertically and laterally. The motion of the support structure is stabilized by a lift producing body (130) disposed in the air above the waterborne craft and coupled to the support structure by a tether (112) for applying a substantially vertically directed force thereto. The pivotal coupling assembly (120) includes a plurality of pivotal coupling elements (122, 154) for buttressing the support structure above the structure of the waterborne craft. Each of the pivotal coupling elements (122, 154) may provide dampening to further stabilize and isolate the motion of the support structure from that of the waterborne craft. The lift producing body (130) may be formed by a parasail-type structure or a more rigid winged structure and incorporate a control system (160, 170) for altering the lift characteristic thereof.

20 Claims, 6 Drawing Sheets

AIR LIFTED MOTION ISOLATION SYSTEM AND METHOD THEREFOR

BACKGROUND OF THE INVENTION

1. Field of the Invention

This invention directs itself to motion isolation systems for stabilizing the motion of a load relative to a reference position. In particular, this invention directs itself to a motion isolation system with air lifted stabilization for use in waterborne craft. More in particular, this invention is directed to a motion stabilization system wherein a gravity load to be isolated from the motion of a waterborne craft is tethered to a lift producing body which is "flown" above the waterborne craft. The lift producing body produces sufficient lift to substantially support the entire weight of the load whose motion is to be isolated. Still further, this invention is directed to a motion isolation system wherein the lift producing body includes a control system for altering the lift characteristic of the lift producing body and thereby compensate for changes in the vertical position of the waterborne craft relative to the lift producing body.

2. Prior Art

Shipboard motion stabilization systems are well known in the art. The best prior art known to the Applicants include U.S. Pat. No. 2,617,377; 3,228,577; 1,446,421; 1,124,906; 4,865,274; 4,738,414; 4,365,772; 5,539,640; 5,483,448; 5,078,335; 4,337,715; 2,169,117; and, 2,865,581.

In some prior art systems, such as that disclosed in U.S. Pat. No. 2,617,377, a motion isolated deck is provided which is stabilized against movement normally imparted to the hull by water action. In such systems the deck assembly is pivoted to the hull in a manner that stabilizes the deck with respect to the hull by means of pivotally coupling the deck to the hull by a universal joint and partially resiliently interconnecting the deck and hull by means of tension springs and shock absorbing elements.

In other systems, such as that disclosed in U.S. Pat. No. 3,228,577, the load supporting structure includes a pendulum-like suspension to provide isolation from random motions of a waterborne craft. The suspended pendulum-like structure is designed to dampen the random motion imparted to it by the moving vessel.

Still other systems, such as that disclosed in U.S. Pat. Nos. 5,539,640 and 5,483,448, disclose active computer controlled suspension systems for providing motion isolation. The cost, size and weight of such active systems which are required to provide motion isolation at high vehicle speeds makes them impractical. Prior art passive systems are substantially ineffective, since they depend solely on gravity as the reference external to the vessel and require the dampening of large masses. However, such prior art systems do not incorporate a lift producing body to provide any portion of the motion isolation or stabilization. The deficiencies of the prior art are overcome by the incorporation of a lift producing body which is "flown" above the vessel and negates the weight of the load whose motion is to be isolated, making it far easier to stabilize the motion of the load relative to an external reference position.

SUMMARY OF THE INVENTION

A motion isolation system with air lifted stabilization for use in a waterborne craft is provided. The motion isolation system includes a platform assembly for supporting an object to be isolated from motion of the waterborne craft. The motion isolation system also includes an assembly pivotally coupled to the platform assembly for dampening motion induced therein by a corresponding motion of the waterborne craft. Further, the motion isolation system includes a lift producing body disposed in air above the waterborne craft and coupled to the platform assembly by a tether for applying a substantially vertically directed force thereto.

It is therefore an object of the invention to provide a motion isolation system for shipboard use which utilizes a lift producing body flown above the vessel to function as a "sky hook" and provide a substantially vertically directed force for supporting the gravity load of the pod or support structure to be isolated from the vessel's motion.

It is another object of the invention to provide an air lifted motion isolation system wherein the load to be isolated from the vessel's motion is coupled to the vessel by an assembly which permits motion in both vertical and lateral directions.

It is yet another object of the invention to provide an air lifted motion isolation system wherein the assembly for coupling the load to be isolated from the vessel's motion provides dampening of at least a portion of the motion imparted to the assembly, especially at the end of travel of the coupling mechanism.

It is a further object of the invention to provide a lift producing body incorporating means for altering the lift characteristics thereof.

It is a still further object of the invention to provide a lift producing body incorporating a control system for altering the lift characteristics of the lift producing body responsive to a change in relative displacement of the vessel towing the lift producing body relative thereto.

It is yet a further object of the invention to provide a control system for altering the lift characteristics of the lift producing body responsive to changes in the position of the load relative to the vessel.

These and other advantages and the novel features of the invention will become apparent from the following detailed description when considered in connection with the accompanying drawings wherein:

DESCRIPTION OF THE PREFERRED EMBODIMENT

Referring now to FIGS. 1–7, there is shown air lifted motion isolation system 100 for stabilizing the motion of some equipment, structure or person relative to the motion of a small high speed vessel 102. As will be seen in following paragraphs, airlifted motion isolation system 100 is specifically directed to the concept of providing an upwardly directed force of sufficient magnitude to substantially counter the weight of the load whose motion is being stabilized. System 100 is particularly adapted to stabilizing computer work stations, gun pods, or other equipment or personnel supporting structures, where the motion of the waterborne craft 102 makes manipulation, use or relaxation difficult, or unfeasible, at high speed or in rough seas.

Figure 1:
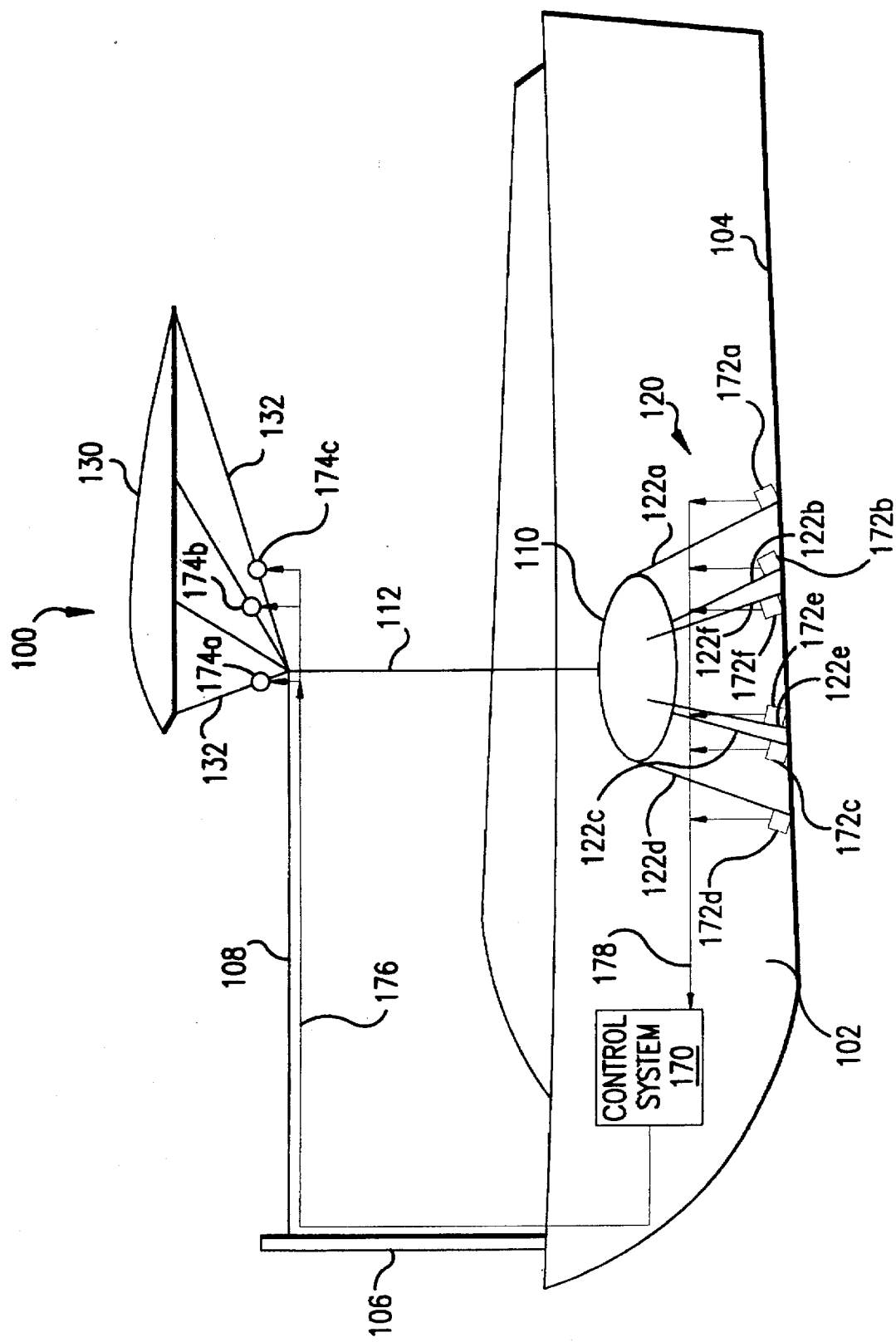
FIG. 1 is a schematic illustration of the present invention.

As shown in FIG. 1, the water borne craft 102 carries a load support in the form of a platform or pod 110, which supports passengers and/or equipment, whose motion is to be isolated from the motion of the vessel. The load support 110 may take the form of a platform for supporting equipment and/or personnel, or may be a complete enclosure encompassing the equipment and/or personnel. Platform or pod 110 is supported above a portion of the waterborne craft 104 by a pivotal coupling assembly 120. Pivotal coupling assembly 120 includes a plurality of pivotal coupling elements 122a–122f. Each of the pivotal coupling elements 122a–122f are formed by extendable struts and by virtue of their coupling between the vessel's structure and the load supporting platform or pod 110 allow the platform or pod 110 to move vertically and laterally with respect to the vessel 102. Other support structures that allow motion may be used in place of platform or pod 110. Such coupling may be in the form of ball or universal joints between the extendable struts and both the support structure 100 and the vessel's structure.

The gravitational load supported by platform 110 is compensated for by means of a lift producing body 130 coupled to the platform 110 by a tether 112. Tether 112 applies a substantially vertically directed lifting force to the platform 110. The lift producing body 130 may be a parasail-like device which is deployed within a few yards of the waterborne craft 102. The parasail is towed by the waterborne craft 102 through a tow line 108, the tow line 108 being connected on one end to the parasail by a plurality of guide or support lines 132, and on the opposing end to a shipboard structural element, such as the tow mast 106. The functions of tow line 108 and tether 112 could be combined into a single line using pulleys or other means.

A measuring device is provided that measures the relative position of pod 110 with respect to the vessel 102. This real-time measurement is used as an input for control of the lift of the lift producing body 130, as will be described in following paragraphs. One convenient and inexpensive method of making that measurement is through the use of a linear measuring device 172a–172f coupled to each leg 122a–122f of pivotal coupling assembly 120. Using well known algorithms executed on a microprocessor, the position and orientation of the pod 110 with respect to the vessel 102 can be generated and input to the control system 170 through the signal input line 178. Control system 170 controls the lift of lift producing body 130 so that on the average, the pod 110 is maintained at the center of motion of the coupling assembly 120. That allows maximum travel of the vessel with respect to the pod. Improved control performance could be achieved with the use of additional sensors, such as accelerometers or gyroscope based inertial sensors. Such added sensors would provide additional information to the control algorithms, and thereby yield improved pod stabilization. Thus, the sensors 172a–172f provide positional input data to control system 170. Control system 170 includes a processor for determining the change in lift required to counter the sensed change in position of the load. Control system 170 provides output signals to the actuators 174a–174c, which physically displace respective portions of the lift producing body to change the lift characteristic of the lift producing body 130.

Where lift producing body 130 is a parasail, the lift produced thereby can be controlled by shortening or lengthening certain of the support lines 132. The change in length of the selected support lines 132 is effected by actuators 174a–174c, which are electrically coupled to control system 170 by the signal output line 176. The angle of tow line 108 with respect to the lifting body 130 will be changing as the vessel 102 pitches and rolls in the waves. To minimize the tendency for this motion to directly change the lifting body angle of attack, tow line 108 is attached to support lines 132 at approximately the center of lift of the lifting body.

The air foil area of lift producing body 130 is selected to supply a predetermined lifting force at a desired forward velocity of the vessel 102. In particular, it has been determined that a lift producing body 130 having an air foil surface area of 200 square feet can provide approximately 400 pounds of lift at 12 knots. Thus, at 12 knots, a 400 pound pod 110 would appear substantially weightless to the vessel 102. The reduction of weight which must be supported by the waterborne craft 102 reduces the vessel's hydrodynamic drag, thereby compensating for the added aerodynamic drag of the lift producing body. Depending upon the configuration of the vessel 102, the reduced weight supported by the vessel could provide an overall reduction in the vessel's drag (hydrodynamic drag summed with aerodynamic drag), allowing the vessel to attain a higher forward velocity with system 100 than can be achieved without its deployment. However, such is not necessary for operation of air lifted isolation system 100.

Figure 3:
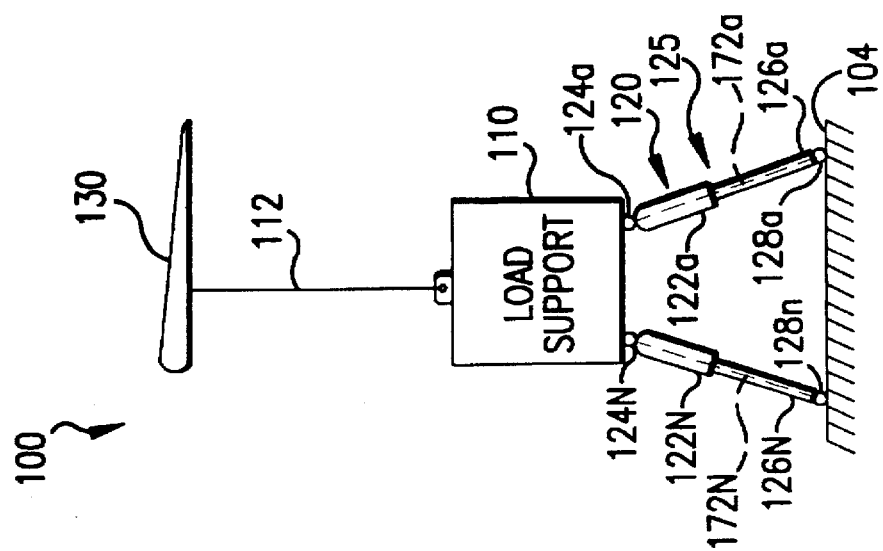
FIG. 3 is a block diagram further illustrating the present invention.

As shown in FIG. 3, the load support 110 is pivotally coupled to a portion of the waterborne craft 104 by means of the pivotal coupling assembly 120. The pivotal coupling assembly 120 may include a plurality of coupling elements 122a–122N, permitting the load support 110 to be displaced both vertically and laterally. Pivotal coupling assembly 120 may be assembled from commercially available telescoping legs and universal joints to create what is known as a hexapod. Each pivotal coupling element 122 is pivotally coupled on one end 124 to the load support 110 and on the opposing end 128 through the vessel's structure by ball or universal type joints. Each coupling element 122 includes at least one extendable portion 126 telescopingly coupled thereto. The pivotal coupling assembly 120 may include a dampening system 125 wherein each of the extendable coupling elements 122a–122N are in the form of shock-absorbing type elements to provide motion dampening, especially at the end of travel of the telescoping elements. Each shock-absorbing type element 122a–122N includes a linear displacement measurement sensor 172a–172N, to provide extension data to control system 170. Other sensor configurations could also be used to provide the relative position and orientation of the pod 110 with respect to the vessel 102. Further, each of the elements 122a–122N incorporate means for limiting the displacement of the load support 110 to avoid a collision with the vessel's structure, which otherwise might occur under severe conditions. Key to the stabilization of load support 110 is the lift supplied thereto by the lift producing body 130 through the tether 112. Where the lift producing body 130 cancels the weight of the load whose motion is to be isolated, the dampening provided by system 125 can be more effective since the vertical force vector of the load is substantially eliminated.

Figure 2:
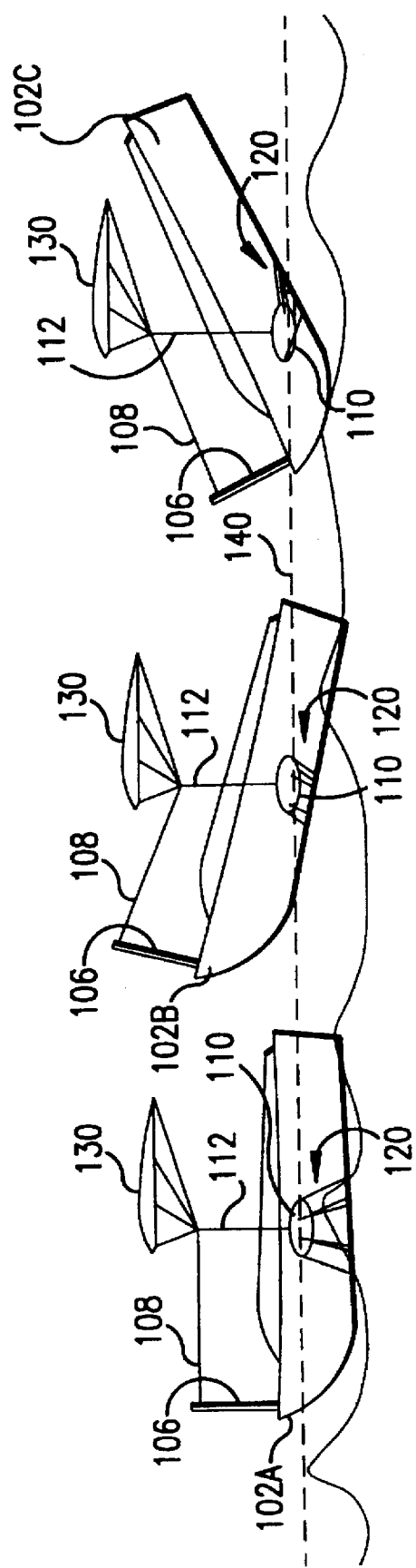
FIG. 2 is a diagram illustrating the use of the present invention.

The tether 112 provides a positional reference which over a short period of time is substantially decoupled from the motion of the vessel, and provides a substantially vertically directed force which assists in stabilizing the location of the pod 110 relative to an external reference elevation 140. As shown in FIG. 2, the pod 110 in the vessel 102a is located at a certain elevation within the vessel, that elevation having a predetermined relationship with respect to an external elevation reference 140 when the vessel is at a neutral position. Ideally, the neutral position is the position where all legs of coupling assembly 120 are extended to 50% of their total travel, maximizing motion of the pod 110 with respect to vessel 102. Control system 170 provides outputs to the actuators 174a–174c to adjust the lift of the lifting body 130 so that the average position of the pod remains at that 50% extension point for all of the legs. If the average position of the pod rises, the lift of the lifting body is reduced to return the pod to the neutral position. Likewise, if the average position of the pod drops, then the lift of the lifting body is increased. The vessels 102b and 102c show the displacement of the respective pods 110 relative to the vessels in which they are disposed. However, in each case, their respective lift producing bodies 130 stabilize the location of the pods 110 relative to the external reference 140. While the diagram shows the stabilization of the pods 110 with respect to changes in elevation and pitch of the respective vessels, a similar effect is obtained with respect to roll of the vessel. However, as the vessel is moving with a forward velocity of at least 12 knots, the pitch component of the vessel's motion will predominate.

Figure 4:
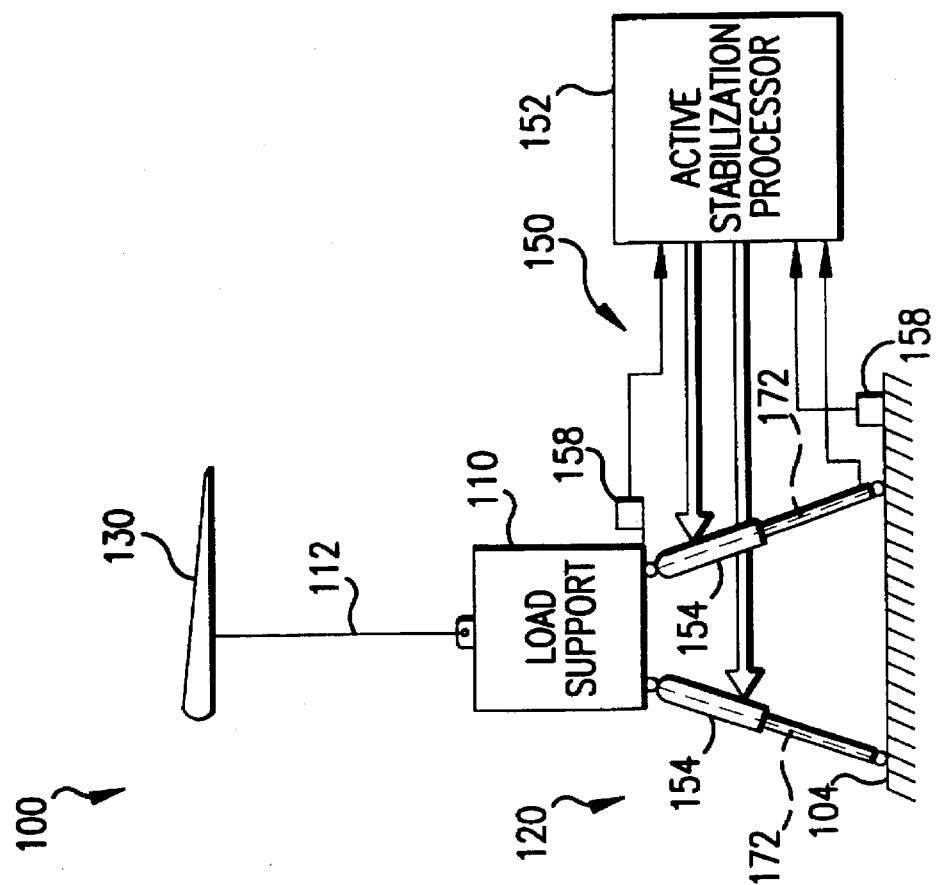
FIG. 4 is a block diagram of an alternate configuration of the present invention.

Referring now to FIG. 4, there is shown a configuration of system 100 wherein active stabilization system 150 is provided to supplement the stabilization provided by the lift producing body 130 when the vessel's forward velocity is less than the predetermined value at which the weight of pod 110 is canceled by the lift of lift producing body 130 or when higher degrees of stabilization are required than can be provided by aerodynamic lift alone. In this arrangement, the load support 110 is pivotally coupled to the vessel's structure 104 by a pivotal coupling assembly 120 having a plurality of cylinders 154, which may be any number of cylinders which permit the load support 110 to be displaced both vertically and laterally, as previously described. Unlike the configuration of FIG. 3, cylinders 154 must be active, i.e. be able to generate motion as well as resist motion. Pneumatic, hydraulic, or electric linear actuators could be used. Each of the plurality of cylinders 154 are coupled to an active stabilization processor 152 for controlling the amount of dampening or displacement each cylinder supplies. Such change in dampening and displacement may be provided fluidically or electromagnetically, which method is not important to the inventive concepts of system 100. Active stabilization processor 152 receives input from a plurality of motion sensors 158 coupled to both the vessel structure 104 and the load support 110 and linear displacement sensors 172. The motion sensors 158 may provide rate of change information as well as the magnitude of displacement to processor 152 to assist in stabilizing the position of the load support 110. As the active stabilization system 150 is assisting, but not replacing the passive system, system 150 need not be capable of generating as high a level of forces as would be required if the active stabilization system were required to maintain the position of load support 110 when the vessel was traveling at a high rate of speed and the vessel's relative motion was changing rapidly. As some lift would always be provided by the lift producing body 130 above a critical speed value, such also contributes to the stabilization of the load. At speeds where the lift producing body 130 no longer supplies lift, the rate of change in the vessel's motion would be sufficiently slow to be easily stabilized by cylinders 154, making this limited active stabilization of the load practical.

In extreme cases of vessel motion, the coupling assembly will continually reach the end of its travel. In that case, dampening is required at the ends of travel to prevent sudden motion stoppage. Additionally, computer controlled dampening, such as can be achieved with magneto-rheological linear dampeners would allow the control computer to adjust the dampening in each leg in an optimal manner for the current wave state and vehicle velocity. When the pod motion does not exceed the range of travel of the coupling assembly, then no dampening is required. In fact, any dampening provided at other than the end of travel of the coupling assembly will deteriorate performance of the isolation system.

Figure 5:
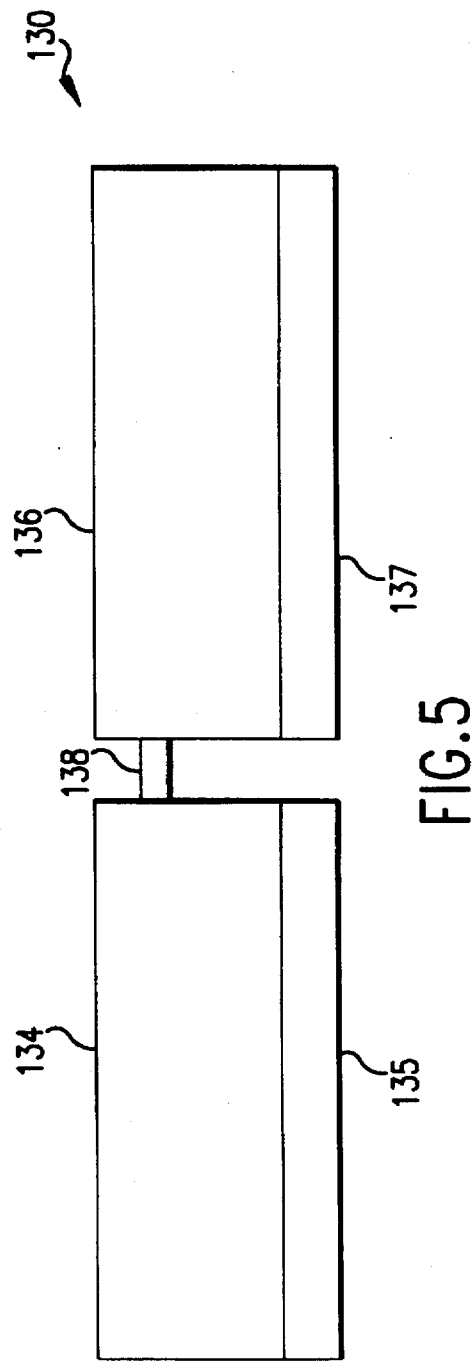
FIG. 5 is a plan view of a lift producing body of the present invention.
Figure 6:
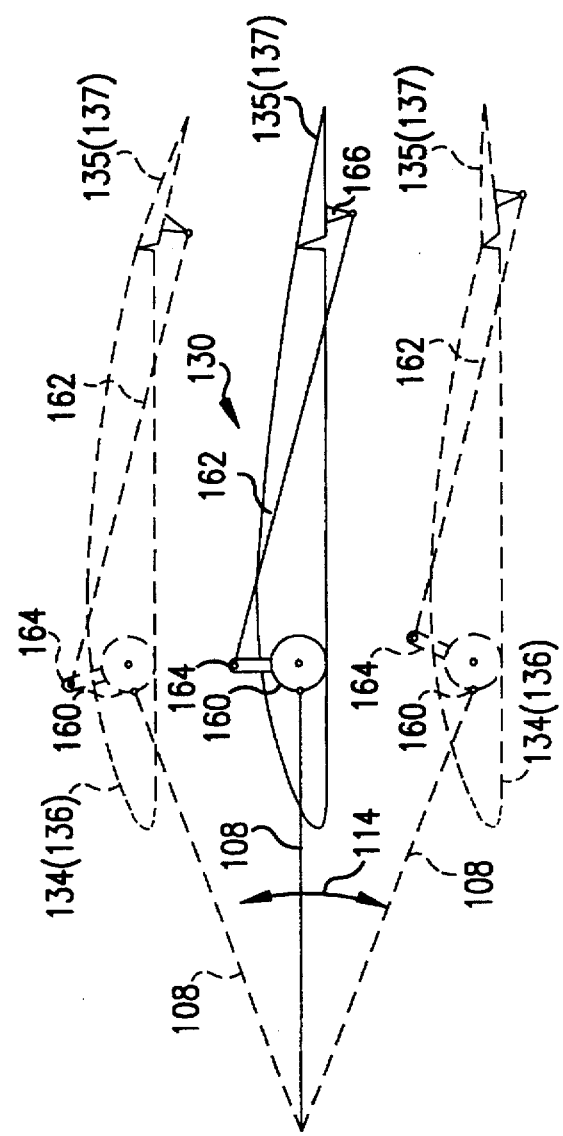
FIG. 6 is a schematic illustration of the lift altering control system of the present invention.

Referring to FIGS. 5 and 6, there is shown a lift producing body 130 in the form of a winged structure, wherein fixed air foil wing sections 134, 136 are supported by a main spar 138. The vessel 102 may incorporate a cradle into which the main spar 138 is secured when the lift producing body is not being "flown", as when the vessel is not moving forward or moving very slowly. Obviously, other means may be utilized to secure the lift producing body to the vessel when it is not being deployed, without departing from the inventive concepts disclosed herein. Although a free wing type configuration is shown, it is well within the scope of the instant invention to incorporate other lifting body type configurations or conventional aircraft type structures. The amount of lift produced by the winged structure 130 can be varied by changing its angle of attack. Controlling the angle of attack of a free wing is easier than controlling the lift of a parasail, which is an advantage for that approach.

As shown, each wing section 134, 136 includes a respective displaceable control surface 135, 137 disposed at the respective trailing edges of the air foil sections 134, 136. The winged lift producing body 130 includes a control system 160 coupled to the tow line 108 for changing the position of the displaceable control surfaces 135, 137 to thereby alter the lift characteristics of the winged structure by changing the angle of attack thereof. Control system 160 includes at least one linkage 162 coupled between a control arm 164 of control system 160, on one end thereof. On the opposing end, linkage 162 is coupled to a respective control horn 166 coupled to the displaceable control surface 135, 137. Thus, each of the displaceable control surfaces 135 and 137 may be mechanically coupled together such that a single linkage 162 may be utilized to simultaneously change the position of both surfaces. Alternately, a pair of linkages 162 may extend from a single or a pair of control arms 164, each linkage 162 being coupled on the opposing end to the respective displaceable control surface 135, 137 by a respective control horn 166. By means of its coupling with the waterborne craft 102 through tow line 108, the winged lift producing body 130 alters its lift characteristic, angle of attack, responsive to changes in it position relative to the vessel 102.

As indicated by the directional arrow 114, when the vessel moves up or down relative to the winged lift producing body 130, such causes the relationship between the tow line 108 and the lifting body to change. The change in angular relationship of the tow line 108 with respect to the lift producing body, and more particularly with respect to the control system 160, causes the control system 160 to displace the control arm 164 and thereby change the position of the displaceable control surfaces 135, 137. By this arrangement, the lift characteristics of the lift producing body 130 are changed to compensate for the average vertical displacement of lift producing body 130 with respect to vessel 102.

Figure 7:
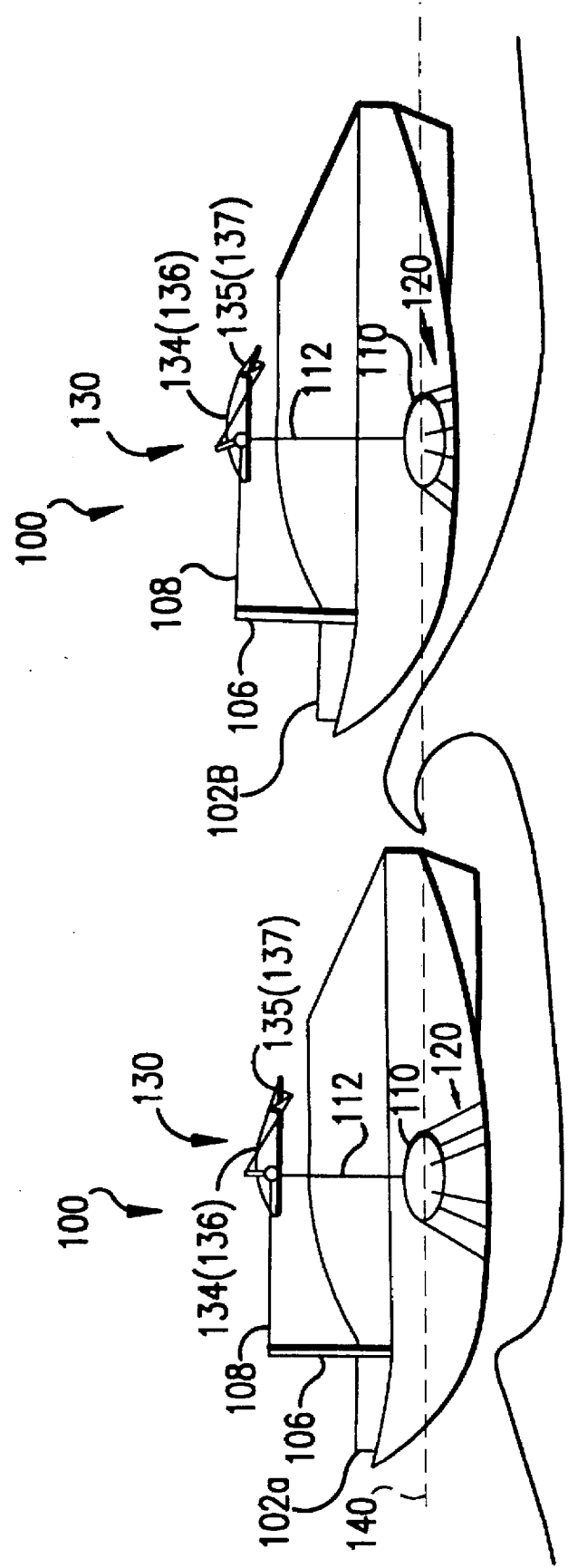
FIG. 7 is a diagram illustrating the operation of the lift altering control system of the present invention; and, FIG. 8 is a schematic illustration of another configuration of the lift altering control system of the present invention.

As shown in FIG. 7, the vessel 102a carries a load support 110 stabilized by the winged lift producing body 130. The load support pod 110 is maintained at an elevation having a predetermined relationship with respect to the external elevation reference 140. With the vessel in a neutral position, the displaceable control surfaces 135, 137 are positioned so that the lift from the winged lift producing body 130 approximately matches the combined weights of the winged lift producing body 130, the load support pod 110, and the payload. As the speed of the vessel increases, the lift will increase and thereby cause the winged lift producing body 130 to begin to rise. That will change the relationship of the tow line 108 with respect to the winged lift producing body 130, which is the condition illustrated by the vessel 102b. In order to keep the pod 110 from rising, the control means will adjust the control surfaces 135, 137 to be directed to keep the wing from rising. The corresponding situation, when the vessel's speed decreases, results in a decrease in lift. In order to keep the wing from dropping, and thereby prevent the pod from dropping, the control surfaces 135, 137 must be adjusted so as to increase the lift characteristic of the wing. That change in the control surfaces 135, 137 raises the lift producing body 130.

As the vessel pitches in the water, the angle of the tow line 108 with respect to the winged lift producing body 130 will continually change. In an ideal system, this rapidly changing angle would have no effect on the lift producing body. The control linkages and control surfaces will be sized to have a long time constant so that these rapid changes have minimal effect. Attaching the tow line to the center of lift of the winged lift producing body will help minimize the undesired changes in the lift characteristics of the wing as a result of the relatively rapid pitching of the vessel. With a fully electronic control approach, as will be described in following paragraphs, the rapid changes in pitch angle of the vessel can be directly measured and algorithmically eliminated as a factor in controlling the lift characteristic of the winged lift producing body.

The mechanical control 160 used with the free wing lift producing device 130 replaces the electronic control of the parasail type lift producing device. Like the electronic control system, control system 160 is designed to maintain the average position of pod 110 at approximately the midpoint of the coupling assembly. Since it is the average position of the lifting body and pod that is to be controlled, the response time of the wing to changes in the angle of the tow line 108 can be slow, effecting the position of the pod only after several wave cycles.

Figure 8:
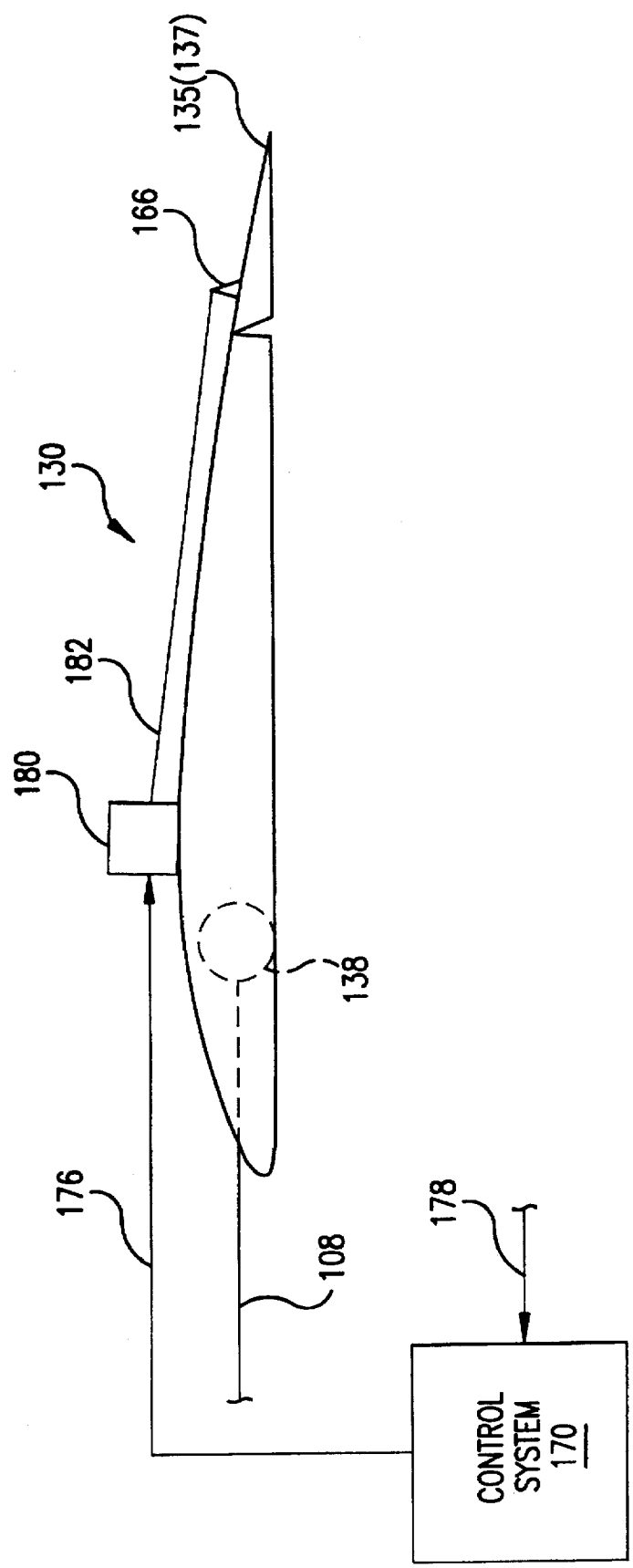

Depending on the performance desired, the mechanical linkages of control system 160 could be augmented or replaced by an electronic system. As shown in FIG. 8, the electronic control system 170 controls the wing lift within one wave cycle, as well as controlling the longer term average operating position of the pod. The sensors required would be the same as those previously discussed for the parasail type lifting body, and are input on signal line 178. The tow line 108 is coupled to the main spar 138 and actuators 180 are electrically coupled to the control system 170 by one or more signal output lines 176 and mechanically coupled to the control surfaces 135 and 137 by a respective one or more link members 182 coupled to respective control horns 166. The angle of attack of the free wing is controlled by displacement of those control surfaces, responsive to a processor included in control system 170 determining the change in lift required to maintain the average position of the load at the neutral position.

Thus, for isolating a gravity load from motion of a waterborne craft, system 100 pivotally supports the load above a portion of the waterborne craft for motion both vertically and laterally, and provides a lift producing body coupled to the load for applying a substantially vertically directed force to the load. The lift producing body is towed by the waterborne craft in order to generate the substantially vertically directed force. In pivotally supporting the load, system 100 may provide motion dampening to each of a plurality of members providing the pivotal support. System 100 may also provide displaceable control surfaces coupled to the lift producing body and provide it with a control system for changing the lift characteristic of the lift producing body responsive to a change in orientation of the waterborne craft. System 100 may also provide active stabilization, wherein at least a portion of the motion induced in the load by a corresponding motion in the waterborne craft is countered, to assist the lift producing body 130 in stabilizing the supported load.

In summary, air lifted motion isolation system 100 includes a platform structure or pod 110 for supporting an object, defining a gravity load to be isolated from motion of a waterborne craft. The object may be equipment and/or personnel. System 100 further includes a pivotal coupling assembly 120 coupled to the platform structure and adapted to buttress the platform above a portion of the waterborne craft's structure to which it is pivotally coupled. A lift producing body 130 is also included in system 100 and disposed a few yards above the waterborne craft and coupled to the platform structure by a tether for applying a substantially vertically directed force thereto. The surface area of the lift producing body 130 is selected to compensate or counter the gravity load being supported, and provides a reference force vector which is substantially independent from the waterborne craft's motion.

The lift producing body 130 may take the form of a parasail, or like structure, or alternately may be in the form of a more rigid winged structure, such as that shown in FIG. 5. The lift producing body may have its lift characteristic altered through the use of displaceable control surfaces 135, 137 coupled to a control system 160 for altering the position of the control surfaces responsive to a change in the displacement of the waterborne craft relative to the lift producing body.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A motion isolation system with air lifted stabilization for use in a waterborne craft, comprising:

platform means for supporting an object to be isolated from motion of the waterborne craft;

means for pivotally coupling said platform means to the waterborne craft; and, a lift producing body disposed in air above the waterborne craft and coupled to said platform means by a first tether for applying a substantially vertically directed force thereto.

2. The motion isolation system as recited in claim 1 further comprising a second tether coupled between said lift producing body and the waterborne craft for towing said lift producing body through the air.

3. The motion isolation system as recited in claim 2 where said lift producing body is a parafoil.

4. The motion isolation system as recited in claim 2 where said lift producing body is a winged structure.

5. The motion isolation system as recited in claim 4 where said winged structure includes displaceable control surfaces for altering a lift characteristic thereof.

6. The motion isolation system as recited in claim 5 where said winged structure includes a control system coupled between said second tether and said displaceable control surfaces for changing said lift characteristic of said winged structure responsive to a change in orientation of the waterborne craft with respect to said winged structure.

7. The motion isolation system as recited in claim 1 where said coupling means includes a plurality of extendable leg members having a first end pivotally coupled to said platform means and an opposing second end pivotally coupled to structural members of the waterborne craft.

8. The motion isolation system as recited in claim 1 where said coupling means includes means for at least partially countering motion induced in said platform means by a corresponding motion of the waterborne craft.

9. The motion isolation system as recited in claim 1 further comprising means coupled to said lift producing body and said coupling means for altering a lift characteristic of said lift producing body responsive to a displacement of said platform means relative to the waterborne craft.

10. The motion isolation system as recited in claim 9 where said means for altering a lift characteristic includes at least one actuator coupled to said lift producing body for displacing a portion thereof to change its lift characteristic and thereby to substantially negate a combined weight of said platform means and the object being supported thereby over a wide range of forward velocities of the waterborne craft.

11. A motion isolation system with air lifted stabilization for use in a waterborne craft, comprising:

means for supporting a gravity load to be isolated from motion of the waterborne craft;

means for pivotally coupling said support means to the waterborne craft's structure, said pivotal coupling means being adapted to buttress said support means above the waterborne craft's structure to which it is pivotally coupled; and, a lift producing body towed by the waterborne craft in air above the waterborne craft, said lift producing body being coupled to said support means by a tether for applying a vertically directed force thereto.

12. The motion isolation system as recited in claim 11 further comprising control means coupled to said lift producing body and said coupling means for adjusting a lift characteristic of said lift producing body responsive to a displacement of said support means relative to the waterborne craft's structure.

13. The motion isolation system as recited in claim 12 where said lift producing body includes displaceable control surfaces coupled to said control means for altering a lift characteristic of said lift producing body.

14. The motion isolation system as recited in claim 11 where said lift producing body includes displaceable control surfaces and a control system coupled between a tow line coupled to the waterborne craft and said displaceable control surfaces for changing said lift characteristic of said lift producing body responsive to a change in orientation of the waterborne craft.

15. The motion isolation system as recited in claim 12 where said control means includes (a) means for sensing a position of said support means relative to the waterborne craft's structure coupled to said coupling means, (b) actuator means coupled to said lift producing body for altering a lift characteristic thereof, and (c) processor means electrically coupled to said sensing means and said actuator means for controlling said lift characteristic of said lift producing body responsive to said sensed position of said support means.

16. A method of isolating a gravity load from motion of a waterborne craft, comprising the steps of:

a. pivotally supporting the load above a portion of the waterborne craft;

b. providing a lift producing body coupled to the load for applying a substantially vertically directed force to the load; and, c. towing said lift producing body with the waterborne craft to generate said force.

17. The method as recited in claim 16 where the step of pivotally supporting includes the step of providing motion dampening at ends of travel of members pivotally supporting the load.

18. The method as recited in claim 16 where the step of providing a lift producing body includes the step of providing means for displacing a portion of said lift producing body for altering a lift characteristic of said lift producing body.

19. The method as recited in claim 18 where the step of providing means for displacing a portion of said lift producing body includes the step of providing a control system for changing said lift characteristic of said lift producing body responsive to a change in displacement of the waterborne craft with respect to said lift producing body.

20. The method as recited in claim 16 where the step of pivotally supporting the load includes the step of providing means for at least partially countering motion induced in the load by a corresponding motion of the waterborne craft.

* * * * *